(12) United States Patent
Xu et al.

(10) Patent No.: US 9,877,216 B2
(45) Date of Patent: Jan. 23, 2018

(54) MINIMIZATION OF DRIVE TESTS IN DUAL CONNECTIVITY SCENARIO

(71) Applicant: Nokia Solutions and Networks Oy, Espoo (FI)

(72) Inventors: Xiang Xu, Nanjing (CN); Sean Kelley, Hoffman Estates, IL (US); Tsunehiko Chiba, Saitama (JP)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/327,883

(22) PCT Filed: Jul. 25, 2014

(86) PCT No.: PCT/EP2014/066065
§ 371 (c)(1),
(2) Date: Jan. 20, 2017

(87) PCT Pub. No.: WO2016/012053
PCT Pub. Date: Jan. 28, 2016

(65) Prior Publication Data
US 2017/0208491 A1  Jul. 20, 2017

(51) Int. Cl.
*H04W 24/00* (2009.01)
*H04W 24/08* (2009.01)
*H04W 24/10* (2009.01)
*H04W 24/02* (2009.01)
*H04W 92/20* (2009.01)

(52) U.S. Cl.
CPC ........... *H04W 24/08* (2013.01); *H04W 24/02* (2013.01); *H04W 24/10* (2013.01); *H04W 92/20* (2013.01)

(58) Field of Classification Search
CPC ...... H04W 24/08; H04W 24/02; H04W 24/10
USPC .............. 455/67.11, 423, 115.1, 226.1
See application file for complete search history.

(56) References Cited

U.S. PATENT DOCUMENTS

| | | | |
|---|---|---|---|
| 8,892,107 B2 * | 11/2014 | Lee .................... | H04W 24/10 370/252 |
| 9,326,167 B2 * | 4/2016 | Andrianov ............ | H04W 24/08 |
| 9,445,261 B2 * | 9/2016 | Yi ........................ | H04W 12/02 |
| 9,467,887 B2 * | 10/2016 | Feng .................... | H04W 24/10 |
| 9,591,503 B2 * | 3/2017 | Tomala ................ | H04W 24/10 |

(Continued)

FOREIGN PATENT DOCUMENTS

WO    20140113141 A1    7/2014

OTHER PUBLICATIONS

International Search Report and Written Opinion received for corresponding Patent Cooperation Treaty Application No. PCT/EP2014/066065, dated Sep. 29, 2014, 17 pages.

(Continued)

*Primary Examiner* — Sonny Trinh
(74) *Attorney, Agent, or Firm* — Nokia Solutions and Networks Oy

(57) ABSTRACT

A method and apparatus can be configured to receive, by a first network node (for example, a first base station), a minimization-of-drive-test activation command. The method may also comprise performing collection of a first minimization-of-drive-test data. The method may also comprise instructing a second network node (for example, a second base station) to at least one of collect and report a second minimization-of-drive-test data.

12 Claims, 16 Drawing Sheets

(56) References Cited

U.S. PATENT DOCUMENTS

2013/0065612 A1* 3/2013 Siomina ............... H04W 24/10
455/456.2

OTHER PUBLICATIONS

3rd Generation Partnership Project; Technical Specification Group Services and System Aspects; Telecommunication management; Subscriber and equipment trace; Trace control and configuration management, 3GPP Standard; 3GP TS 32.422, vol. SA WG5, No. V12.1.0, Mar. 14, 2014, p. 1-134 XP050769863.
Discussion on RRC signaling via SeNB, 3GP Draft; R2-134005, 3rd Generation Partnership Project, vol. RAN WG2 No. San Francisco, USA Oct. 11, 2013-Oct. 15, 2013, Nov. 13, 2013 XP050736813.
3rd Generation Partnership Project; Technical Specification Group Radio Access Network; Universal Terrestrial Radio Access (UTRA) and Evolved Universal Terrestrial Access (E-UTRA); Radio measurement collection for Minimization of Drive Tests (MDT); Overall description; Stage 2 (Release 11), 3GPP Standard; 3GP TS 37.320, 3rd Generation Partnership Project, vol. RAN WG2 No. V11.3.0, Mar. 15, 2013, pp. 1-23, XP050692281.
NEC Corporation "RRC messages over X2 for DC", 3GPP Draft; R2-140619 RRC Message Over X2, 3rd Generation Partnership Project, vol. RAN WG2, No. Prague, Czech Republic; Feb. 10, 2014-Feb. 14, 2014, Feb. 9, 2014, XP050737755.

* cited by examiner

MINIMIZATION OF DRIVE TESTS IN DUAL CONNECTIVITY SCENARIO

RELATED APPLICATION

This application was originally filed as Patent Cooperation Treaty Application No. PCT/EP2014/066065 filed Jul. 25, 2014.

BACKGROUND

Field

Embodiments of the invention relate to minimization-of-drive-tests.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may comprise receiving, by a first network node, a minimization-of-drive-test activation command. The method may also comprise performing, by the first network node, collection of a first minimization-of-drive-test data. The method may also comprise instructing, by the first network node, a second network node to at least one of collect and report a second minimization-of-drive-test data.

In the method of the first embodiment, the method may also comprise receiving the second minimization-of-drive-test data collected by the second network node. The method may also comprise consolidating the first minimization-of-drive-test data collected by the first network node with the second minimization-of-drive-test data collected by the second network node. The method may also comprise transmitting the consolidated minimization-of-drive-test data to a third network node.

In the method of the first embodiment, the method further comprises transmitting the first minimization-of-drive-test data collected by the first network node to a third network node. The transmitting the first minimization-of-drive-test data collected by the first network node to the third network node comprises transmitting to a node that consolidates the first minimization-of-drive-test data collected by the first network node with other minimization-of-drive-test data.

In the method of the first embodiment, the instructing the second network node to collect the second minimization-of-drive-test data comprises transmitting a minimization-of-drive-test configuration information in an Addition Request message, a Modification Request message, or an X2 message.

In the method of the first embodiment, the method further comprises instructing the second network node to stop collecting the second minimization-of-drive-test data.

In the method of the first embodiment, the instructing the second network node to stop collecting the second minimization-of-drive-test data comprises transmitting a Release Request message or a X2 message.

In the method of the first embodiment, the first minimization-of-drive-test data comprises a radio access bearer identifier associated with the measurement.

In the method of the first embodiment, at least one of the first network node and the second network node comprises a base station.

In the method of the first embodiment, the third network node comprises a trace collection entity.

In the method of the first embodiment, the first and the second minimization-of-drive-test data is related to a user equipment. The user equipment is connected to the first network node and the second network node in parallel.

According to a second embodiment, an apparatus comprises first receiving means for receiving a minimization-of-drive-test activation command. The apparatus also comprises performing means for performing collection of a first minimization-of-drive-test data. The apparatus also comprises first instructing means for instructing a first network node to at least one of collect and report a second minimization-of-drive-test data.

In the apparatus of the second embodiment, the apparatus further comprises second receiving means for receiving the second minimization-of-drive-test data collected by the first network node. The apparatus also comprises consolidating means for consolidating the first minimization-of-drive-test data collected by the apparatus with the second minimization-of-drive-test data collected by the first network node. The apparatus also comprises transmitting means for transmitting the consolidated minimization-of-drive-test data to a second network node.

In the apparatus of the second embodiment, the apparatus further comprises transmitting means for transmitting the first minimization-of-drive-test data collected by the apparatus to a second network node. The transmitting the first minimization-of-drive-test data collected by the apparatus to the second network node comprises transmitting to a node that consolidates the first minimization-of-drive-test data collected by the apparatus with other minimization-of-drive-test data.

In the apparatus of the second embodiment, the instructing the first network node to collect the second minimization-of-drive-test data comprises transmitting a minimization-of-drive-test configuration information in an Addition Request message, a Modification Request message, or an X2 message.

In the apparatus of the second embodiment, the apparatus may further comprise second instructing means for instructing the first network node to stop collecting the second minimization-of-drive-test data.

In the apparatus of the second embodiment, the instructing the first network node to stop collecting the second minimization-of-drive-test data comprises transmitting a Release Request message or a X2 message.

In the apparatus of the second embodiment, the first minimization-of-drive-test data comprises a radio access bearer identifier associated with the measurement.

In the apparatus of the second embodiment, at least one of the apparatus and the first network node comprises a base station.

In the apparatus of the second embodiment, the second network node comprises a trace collection entity.

In the apparatus of the second embodiment, the first and the second minimization-of-drive-test data is related to a user equipment, and the user equipment is connected to the apparatus and the first network node in parallel.

According to a third embodiment, a computer program product may be embodied on a non-transitory computer readable medium. The computer program product may be configured to control a processor to perform a process comprising receiving, by a first network node, a minimization-of-drive-test activation command. The process may also comprise performing, by the first network node, collection of a first minimization-of-drive-test data. The process may also comprise instructing, by the first network node, a second network node to at least one of collect and report a second minimization-of-drive-test data.

According to a fourth embodiment, a method may comprise receiving, by a first network node, instruction from a second network node to collect minimization-of-drive-test data. The method may comprise collecting minimization-of-drive-test data. A user equipment relating to the minimization-of-drive-test data is connected to the first network node and the second network node in parallel.

In the method of the fourth embodiment, the method further comprises receiving instruction to stop collecting the minimization-of-drive-test data.

In the method of the fourth embodiment, the method also comprises transmitting the collected minimization-of-drive-test data to the second network node.

In the method of the fourth embodiment, the receiving the instruction to collect minimization-of-drive-test data comprises receiving a minimization-of-drive-test configuration information in an Addition Request message, a Modification Request message, or a X2 message.

In the method of the fourth embodiment, at least one of the first network node and the second network node comprises a base station.

According to a fifth embodiment, an apparatus comprises receiving means for receiving instruction from a first network node to collect minimization-of-drive-test data. The apparatus also comprises collecting means for collecting minimization-of-drive-test data. A user equipment relating to the minimization-of-drive-test data is connected to the apparatus and the first network node in parallel.

In the apparatus of the fifth embodiment, the apparatus further comprises receiving means for receiving instruction to stop collecting the minimization-of-drive-test data.

In the apparatus of the fifth embodiment, the apparatus also comprises transmitting means for transmitting the collected minimization-of-drive-test data to the first network node.

In the apparatus of the fifth embodiment, the receiving the instruction to collect minimization-of-drive-test data comprises receiving a minimization-of-drive-test configuration information in an Addition Request message, a Modification Request message, or a X2 message.

In the apparatus of the fifth embodiment, at least one of the apparatus and the first network node comprises a base station.

According to a sixth embodiment, a computer program product may be embodied on a non-transitory computer readable medium. The computer program product may be configured to control a processor to perform a process comprising receiving, by a first network node, instruction from a second network node to collect minimization-of-drive-test data. The process may also comprise collecting minimization-of-drive-test data. A user equipment relating to the minimization-of-drive-test data is connected to the first network node and the second network node in parallel.

According to a seventh embodiment, a method comprises receiving, by a first network node, a first minimization-of-drive-test data from a second network node. The method also comprises receiving a second minimization-of-drive test data from a third network node. The second network node and the third network node connect with a user equipment in parallel.

In the method of the seventh embodiment, the method further comprises consolidating the received first minimization-of-drive-test data and the received second minimization-of-drive test data. The consolidation comprises aggregating at least one of uplink data volume, downlink data volume, uplink data throughput, and downlink data throughput.

In the method of the seventh embodiment, the first network node comprises a trace collection entity, and at least one of the second network node and the third network node comprises a base station.

According to an eighth embodiment, an apparatus comprises first receiving means for receiving a first minimization-of-drive-test data from a first network node. The apparatus also comprises second receiving means for receiving a second minimization-of-drive test data from a second network node. The first network node and the second network node connect with a user equipment in parallel.

In the apparatus of the eighth embodiment, the apparatus further comprises consolidating means for consolidating the received first minimization-of-drive test data and the received second minimization-of-drive test data. The consolidation comprises aggregating at least one of uplink data volume, downlink data volume, uplink data throughput, and downlink data throughput.

In the apparatus of the eighth embodiment, the apparatus comprises a trace collection entity, and at least one of the first network node and the second network node comprises a base station.

According to a ninth embodiment, a computer program product may be embodied on a non-transitory computer readable medium. The computer program product may be configured to control a processor to perform a process comprising receiving, by a first network node, a first minimization-of-drive-test data from a second network node. The process may also comprise receiving a second minimization-of-drive test data from a third network node. The second network node and the third network node connect with a user equipment in parallel.

According to a tenth embodiment, a system may comprise a first apparatus. The first apparatus may comprise first receiving means for receiving a minimization-of-drive-test activation command. The first apparatus may also comprise performing means for performing collection of a first minimization-of-drive-test data. The first apparatus may also comprise first instructing means for instructing a second apparatus to at least one of collect and report a second minimization-of-drive-test data. The system may also comprise a second apparatus. The second apparatus may also comprise second receiving means for receiving the instruction from the first apparatus to collect the second minimization-of-drive-test data. The second apparatus may also comprise collecting means for collecting the second minimization-of-drive-test data. The system may also comprise a third apparatus. The third apparatus may comprise third receiving means for receiving the first minimization-of-drive-test data from the first apparatus. The third apparatus also comprises fourth receiving means for receiving the second minimization-of-drive test data from the second apparatus. A user equipment relating to the first and the second minimization-of-drive-test data is connected to the second apparatus and the first apparatus in parallel.

According to an eleventh embodiment, an apparatus may comprise at least one processor. The apparatus may also comprise at least one memory including computer program code. The at least one memory and the computer program code may be configured, with the at least one processor, to cause the apparatus at least to receive a minimization-of-drive-test activation command. The apparatus may also be caused to perform collection of a first minimization-of-drive-test data. The apparatus may also be caused to instruct a network node to at least one of collect and report a second minimization-of-drive-test data.

According to a twelfth embodiment, an apparatus may comprise at least one processor. The apparatus may also comprise at least one memory including computer program code. The at least one memory and the computer program code may be configured, with the at least one processor, to cause the apparatus at least to receive instruction from a network node to collect minimization-of-drive-test data. The apparatus may also be caused to collect minimization-of-drive-test data. A user equipment relating to the minimization-of-drive-test data is connected to the apparatus and the network node in parallel.

According to a thirteenth embodiment, an apparatus may comprise at least one processor. The apparatus may also comprise at least one memory including computer program code. The at least one memory and the computer program code may be configured, with the at least one processor, to cause the apparatus at least to receive a first minimization-of-drive-test data from a first network node. The apparatus may also be caused to receive a second minimization-of-drive test data from a second network node. The first network node and the second network node connect with a user equipment in parallel.

According to a fourteenth embodiment, a system may comprise a first apparatus. The first apparatus may comprise at least one first processor. The first apparatus may also comprise at least one first memory including first computer program code. The at least one first memory and the first computer program code may be configured, with the at least one first processor, to cause the first apparatus at least to receive a minimization-of-drive-test activation command. The first apparatus may also be caused to perform collection of a first minimization-of-drive-test data. The first apparatus may also be caused to instruct a second apparatus to at least one of collect and report a second minimization-of-drive-test data. The system may also comprise a second apparatus. The second apparatus may comprise at least one second processor. The second apparatus may also comprise at least one second memory including second computer program code. The at least one second memory and the second computer program code may be configured, with the at least one second processor, to cause the second apparatus at least to receive instruction from the first apparatus to collect the second minimization-of-drive-test data. The second apparatus may also be caused to collect the second minimization-of-drive-test data. The system may also comprise a third apparatus. The third apparatus may comprise at least one third processor. The third apparatus may also comprise at least one third memory including third computer program code. The third computer program code may be configured, with the at least one third processor, to cause the third apparatus at least to receive the first minimization-of-drive-test data from the first apparatus. The third apparatus may also be caused to receive the second minimization-of-drive test data from the second apparatus. A user equipment relating to the first and the second minimization-of-drive-test data is connected to the second apparatus and the first apparatus in parallel.

BRIEF DESCRIPTION OF THE DRAWINGS

For proper understanding of the invention, reference should be made to the accompanying drawings, wherein.

DETAILED DESCRIPTION

Embodiments of the present invention are directed to performing Minimization of Drive Tests (MDT) in small cells. Embodiments of the present invention can be utilized while performing dual connectivity. As described in more detail below, in one embodiment, MDT data consolidation can be performed at a master evolved Node B (MeNB). In another embodiment, MDT data consolidation can be performed at a Trace Collection Entity (TCE).

Figure 1:
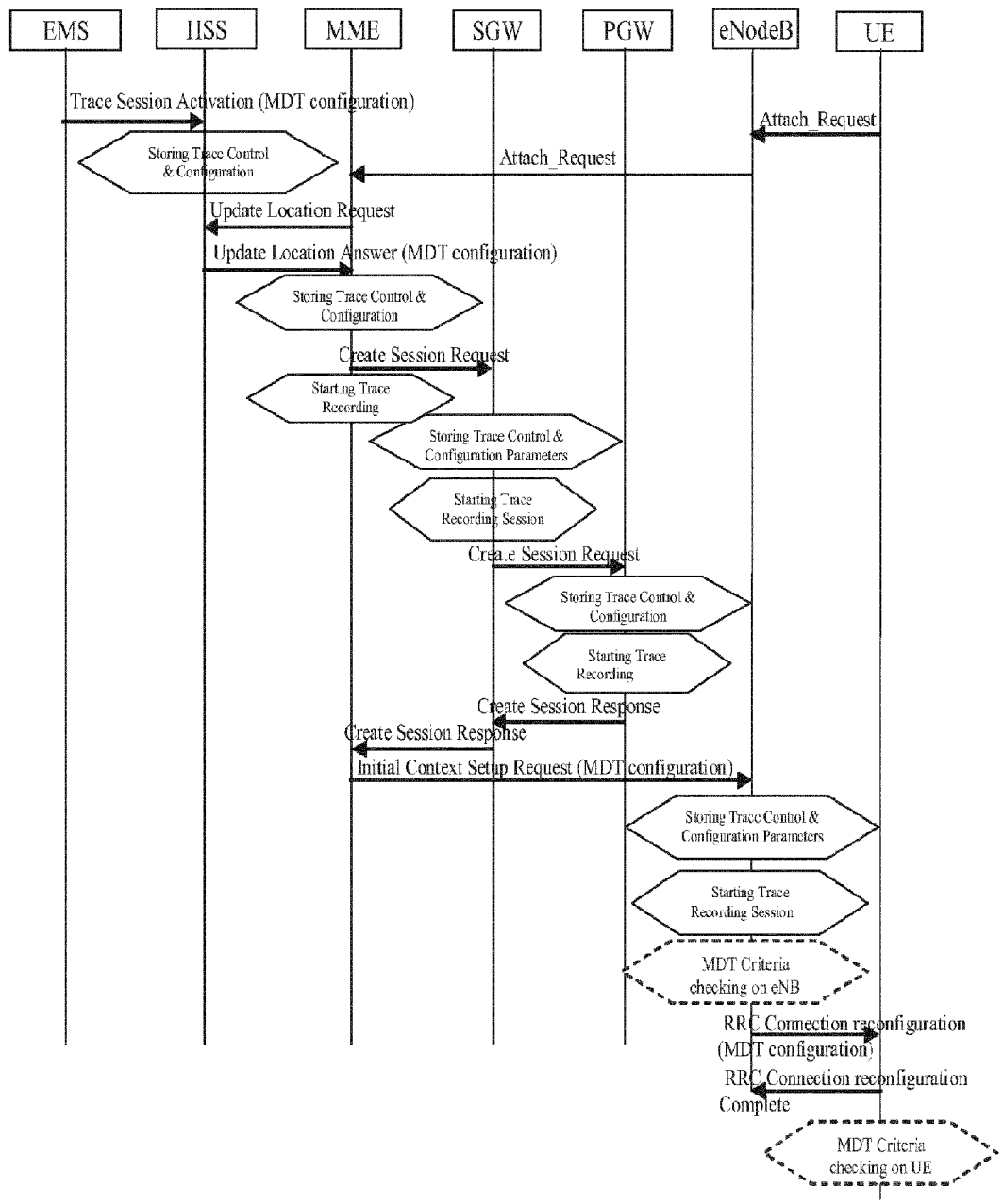
FIG. 1 illustrates an example procedure for activating Minimization of Drive Tests (MDT) in an LTE network.

3GPP TS 37.320 (V11.3.0) defines MDT as performing an automatic collection of user equipment (UE) measurements to minimize the need of manual drive tests. Two types of MDT are defined: (1) Management-based MDT and (2) Signalling-based MDT. For Signalling-based MDT, an MDT configuration may be transferred from a first network node (e.g., a Mobility-Management Entity (MME)) to a second network node (for example, a base station like an evolved Node B (eNB) or an access point), and the MDT configuration is propagated to a third network element (e.g., a target eNB) during a handover procedure. FIG. 1 illustrates an example procedure for activating MDT in an LTE network. The following example table contains a trace record description for immediate MDT measurements in an LTE network. The trace record for management-based activation may be the same as the trace record for signalling-based activation.

| MDT measurement name | Measurement attribute name(s) | Measurement attribute definition |
|---|---|---|
| M1 | RSRPs | List of RSRP values received in RRC measurement report. One |

-continued

| MDT measurement name | Measurement attribute name(s) | Measurement attribute definition |
|---|---|---|
| | RSRQs | value per measured cell. List of RSRQ values received in RRC measurement report. One value per measured cell. |
| | PCIs | List of Physical Cell Identity of measured cells. The order of PCI values in the list should be the same as the corresponding measured values in the RSRPs and RSRQs attributes. |
| | Triggering event | Event that triggered the M1 measurement report, used only in case of RRM configured measurements (events A1, A2, A3, A4, A5, A6, B1 or B2) |
| M2 | PH distr | Distribution of the power headroom samples reported by the UE during the collection period. The distribution is the interval of [40; −23] dB. |
| M3 | RIP distr | Distribution of the measured Received Interference Power samples obtained during the collection period. The distribution is in the interval of [−126, −75] dBm. |
| M4 | UL volumes | List of measured UL volumes in bytes per E-RAB. One value per E-RAB. |
| | DL volumes | List of measured DL volumes in bytes per E-RAB. One value per E-RAB. |
| | QCIs | List of QCIs of the E-RABs for which the volume and throughput measurements apply. The order of QCI values in the list should be the same as the corresponding measured values in the UL volumes and DL volumes attributes. |
| M5 | UL Thp Time | Throughput time used for calculation of the uplink throughput (per UE). |
| | UL Thp Volume | Throughput volume used for calculation of the uplink throughput (per UE). |
| | UL LastTTI Volume | Volume transmitted in the last TTI and excluded from throughput calculation in the uplink. |
| | DL Thp Times | List of throughput times used for calculation of the downlink throughput (per E-RAB). One value per E-RAB. |
| | DL Thp Volumes | List of Throughput volumes used for calculation of the downlink throughput (per E-RAB). One value per E-RAB. |
| | QCIs | List of QCIs of the E-RABs for which the volume and throughput measurements apply. The order of QCI values in the list should be the same as the corresponding measured values in the DL Thp Volumes and DL Thp Times attributes. |
| | DL Thp Time UE | Throughput time used for calculation of the downlink throughput (per UE). |
| | DL Thp Volume UE | Throughput volume used for calculation of the downlink throughput (per UE). |
| | DL LastTTI Volume | Volume transmitted in the last TTI and excluded from the throughput calculation in the downlink (per UE). |

A UE may perform the measuring of Measurement M1 and M2. An eNB may perform the measuring of Measurement M3, M4, and M5. The measurement of M4 may be performed in the Packet Data Convergence Protocol (PDCP) layer. The measurement of M5 may be performed in the Medium Access Control (MAC) layer.

In the case of signalling-based MDT, the eNB may collect MDT measurements from the UE, if the measurements are performed by the UE, and from the eNB, if the measurements are performed locally by the eNB, according to the MDT configuration. The eNB may then provide the collected measurements to a Trace Collection Entity (TCE). The MDT configuration may be passed from the source eNB to the target eNB, during a handover of a UE from the source eNB to the target eNB, to enable MDT session continuity while the UE is in a Radio-Resource-Control CONNECTED (RRC CONNECTED) state. The Trace Reference (TR) and Trace Recording Session Reference (TRSR) can uniquely identify the MDT session, which may be tagged to all trace records sent to the TCE.

3GPP addresses Dual Connectivity for LTE. Small cells can be used as low-power nodes to boost a capacity of a cellular network that has been already deployed. Dual Connectivity in LTE Release 12 focuses on a scenario where macro and small cells are on different carrier frequencies (i.e., inter-frequency scenario).

Figure 2:
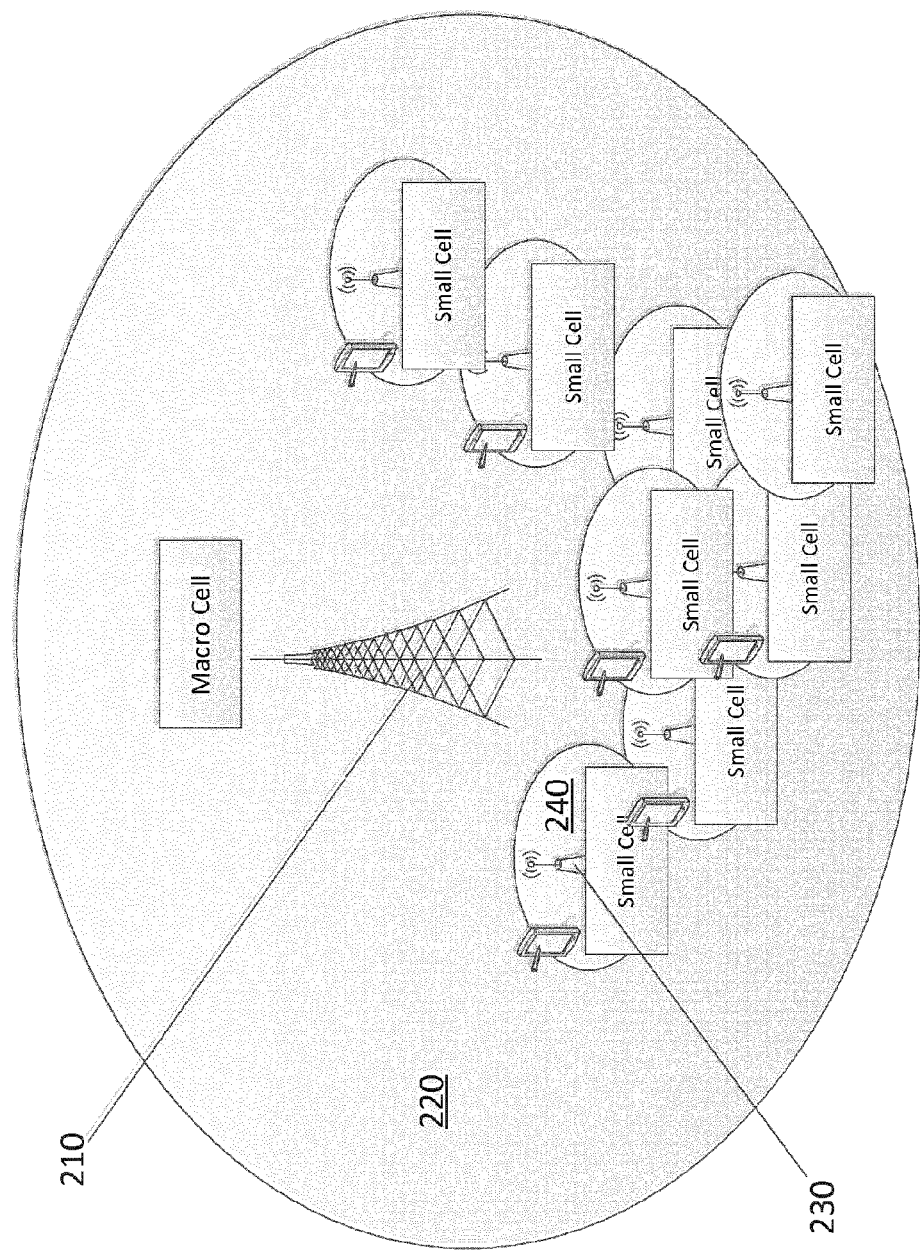
FIG. 2 illustrates an example deployment scenario for a small cell system.

FIG. 2 illustrates an example deployment scenario for a small cell system. From a deployment perspective, an operator may upgrade a macro evolved Node B (eNB) 210, comprising one or more macro cells 220, to be a Master eNB (MeNB) to ensure proper coverage, and the operator may deploy lower power nodes (such as secondary evolved Node Bs (SeNBs) 230, comprising one or more small cells 240), to provide capacity enhancement.

Figure 3:
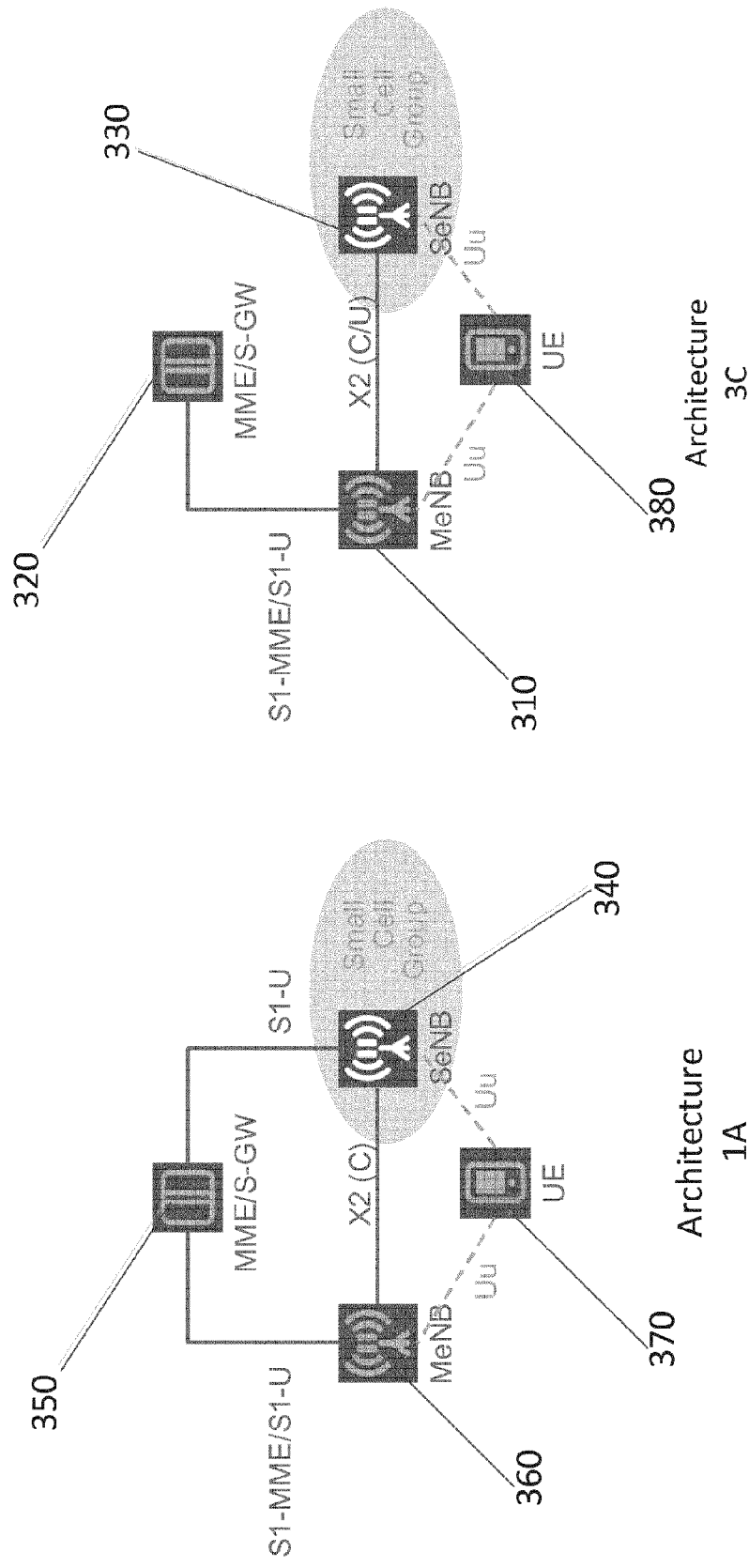
FIG. 3 illustrates example small cell architectures.

FIG. 3 illustrates example small cell architectures. Dual Connectivity refers to operation where a given UE consumes radio resources that are provided by at least two different network points that are connected by backhaul technologies categorized as non-ideal backhaul in 3GPP TR 36.932 V12.1.0. Dual Connectivity may provide a variety of benefits. For example, Dual Connectivity can provide throughput enhancements with inter-eNB carrier aggregation. Dual-connectivity can also provide traffic offload to a small cell. With dual-connectivity, a macro cell may avoid processing of user-plane data.

With dual connectivity, three types of bearers exist. First, for Master Cell Group (MCG) bearers, the MeNB is U-plane-connected to a Serving-Gateway (S-GW) via S1-U, and the SeNB is not involved in the transport of user plane data. Second, for split bearers, the MeNB 310 is U-plane-connected to the S-GW 320 via S1-U and, in addition, the MeNB 310 and the SeNB 330 are U-plane interconnected via X2-U (see FIG. 3, architecture 3C). Third, for Secondary Cell Group (SCG) bearers, the SeNB 340 is directly connected with the S-GW 350 via S1-U (see FIG. 3, architecture 1A). Of the three different types of bearers for dual connectivity, embodiments of the present invention are applicable to split bearers and/or SCG bearers.

The special characteristics of the user plane bearer in dual connectivity pose challenges to MDT. For example, referring to architecture 1A of FIG. 3, there are two Packet-Data-Convergence Protocol (PDCP) entities in the network (one in each of MeNB 360 and SeNB 340) for a UE 370. Further, there are two MAC entities in the network (one in each of MeNB 310, 360 and SeNB 330, 340) for a UE 370, 380 in both architecture 1A and 3C of FIG. 3. Also, the MeNB does not use any handover procedure when offloading the user plane bearer to SeNB.

MDT measurements M4 and M5 relate to the collection of data volume and scheduled internet-protocol (IP) throughput, respectively, for a UE in a given geo-location (which is optionally provided by measurement M1). Since a UE in Dual Connectivity mode may support two parallel U-Plane (Uu) connections to the SeNB and MeNB, the collection of MDT M4 and M5 data is not straight-forward anymore. Therefore, there exists a need to provide a solution for how to collect, for example, M4 and M5 MDT measurements in case of dual connectivity mode to provide a full picture of the user experience.

Prior art approaches are directed to methods for configuring the terminal measurement for carrier aggregation which are performed by one eNB. However, the prior art approaches do not solve the problem of how to perform MDT measurements in dual connectivity scenario.

Embodiments of the present invention are directed to a method for supporting MDT for a small-cell system. Embodiments of the present invention may terminate the MDT activation/deactivation command in a master base station. Embodiments of the present invention may also configure a secondary base station to collect MDT data. Embodiments of the present invention may also perform the measuring at the master base station and at the secondary base station. Embodiments of the present invention may configure two eNBs to cooperatively and simultaneously perform the MDT measurements for a particular UE. Embodiments of the present invention may also consolidate, by the master base station, MDT data that is collected by the master base station and collected by the secondary base station. The master base station may send the consolidated MDT data to the Trace Collection Entity. Embodiments of the present invention may also send the MDT data (separately from the master base station and from the secondary base station or both via the master base station) to the Trace Collection Entity and consolidate the MDT data in the Trace Collection Entity. MDT data, optionally, comprises an indication of radio-access bearers, such as EUTRAN Radio-Access-Bearers (E-RAB), associated with the MDT data. Embodiments of the present invention may also indicate the measurement related to the secondary base station. Embodiments of the present invention may also configure the secondary base station to stop the MDT data collection.

Embodiments of the present invention may provide the network with a full picture of user experience for UEs in dual connectivity. Thus, embodiments of the present invention may enable the operator to use MDT trace records to optimize the small-cell system for dual connectivity.

Figure 4:
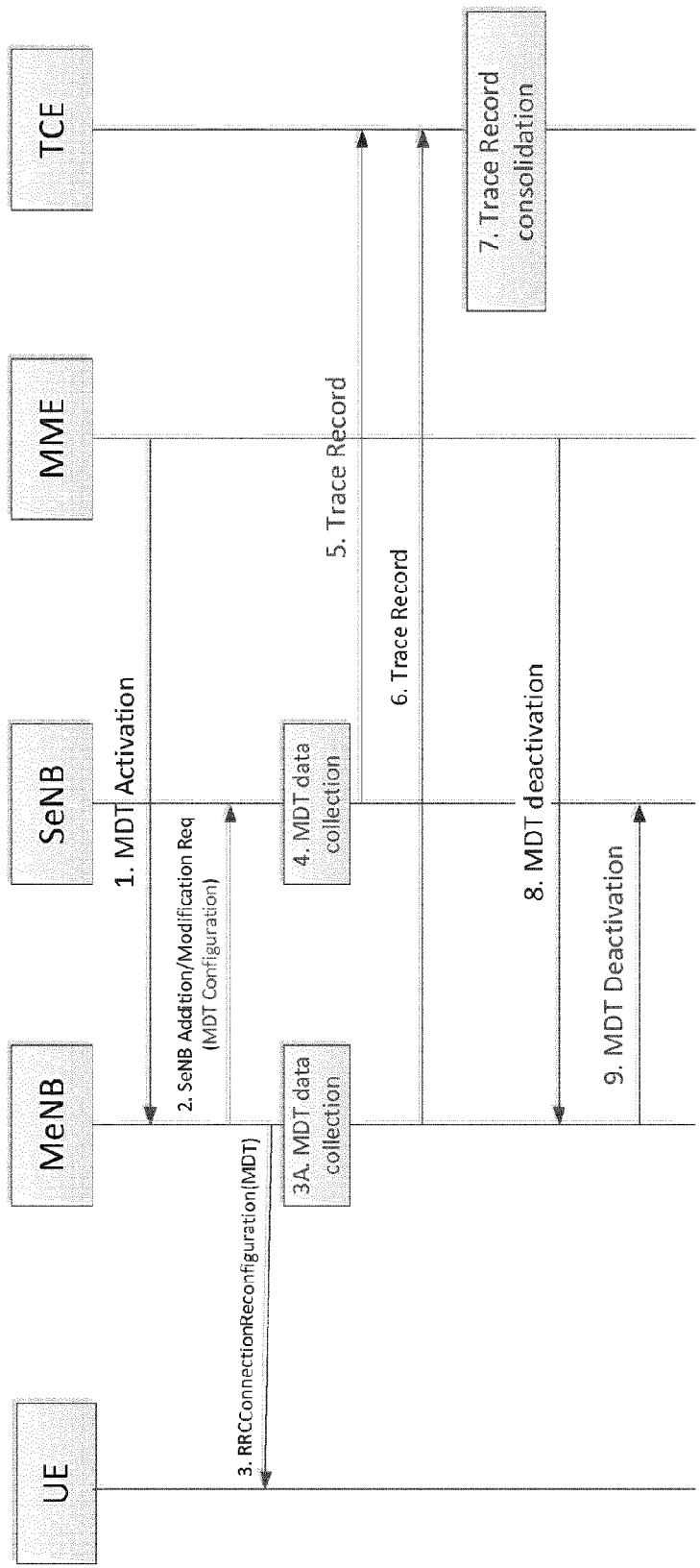
FIG. 4 illustrates a Trace Collection Entity (TCE) that consolidates MDT data in accordance with one embodiment.

FIG. 4 illustrates a network element, for example a TCE, that consolidates MDT data in accordance with one embodiment. Referring to FIG. 4, in one embodiment, another network element, for example a MME, first initiates the MDT activation by sending the MDT Configuration to a first network node, for example a MeNB, in, for example a S1 Initial Context Setup Request message, or in a S1 Handover Request message. Second, the MeNB may send the MDT Configuration, in whole or in part, to a second network node, for example a SeNB, in for example a X2 (SeNB) Addition Request message, or in an (SeNB) Modification Request message. In the event that the MeNB already knows the MDT Configuration before the MeNB adds the SeNB, then the MeNB may use the (SeNB) Addition Request message. Otherwise, the MeNB may use the (SeNB) Modification Request message. The MeNB may also forward a Cell-Radio-Network-Temporary-Identifier (C-RNTI) to the SeNB.

Third, the MeNB may configure the UE to perform the required UE-based measurements (such as measurement M1, for example), and the MeNB may perform the required MeNB measurements (such as measurements M4 and M5, for example). Performing the required MeNB measurements may be considered to be a collecting of a first minimization-of-drive-test data. Fourth, the SeNB may perform the SeNB MDT measurements (such as measurements M4 and M5, for example). The performing of SeNB MDT measurements may be considered to be a collecting of a second minimization-of-drive-test data. The MeNB and SeNB may be connected to a user equipment in parallel. In other words, the user equipment may exchange user data and/or signaling information with the SeNB and the MeNB in parallel. Being connected in parallel does not necessarily imply that user data and/or signaling information is exchanged between the user equipment, the MeNB, and the SeNB, at the same time (simultaneously), although the user data and/or signaling information may be exchanged at the same time. User data and/or signaling information may be exchanged between the UE and the MeNB, and between the UE and the SeNB, sequentially, while the parallel connection of the UE to the MeNB and to the SeNB is maintained. Fifth, the SeNB may send a Trace Record to TCE, comprising, for example, a E-UTRAN Trace ID (TR+TRSR) and the MDT data collected by the SeNB. The Trace Record may comprise additional information, such as, for example, the SeNB cell identifier(s), the indication for split bearers or SCG bearers, related Quality-of-Service Class Identifiers, and E-RAB IDs. Sixth, the MeNB may send the Trace Record to the TCE, which may comprise the same E-UTRAN Trace ID, along with MDT data collected by the MeNB and additional information.

Seventh, the TCE may consolidate the Trace Record received from the MeNB and the SeNB. The TCE may use the Trace Reference and Trace Recording Session Reference to identify trace records of the same MDT session. The TCE may use the timestamps of the MDT data to determine data which should be combined (data relating to uplink (UL) volumes, downlink (DL) volumes, UL Thp Volume, DL Thp Volumes, for example). Other information such as E-RAB IDs may also be used to combine the MDT data (depending on whether the data is per-RAB or per UE). Eighth, the MME may initiate the MDT deactivation procedure. Ninth, the MeNB may initiate the MDT deactivation procedure to the SeNB. This function may be implemented by adding the deactivation indication in the Release Request message (for example, a SeNB Release Request message), or by introducing a new X2 message.

Figure 5:
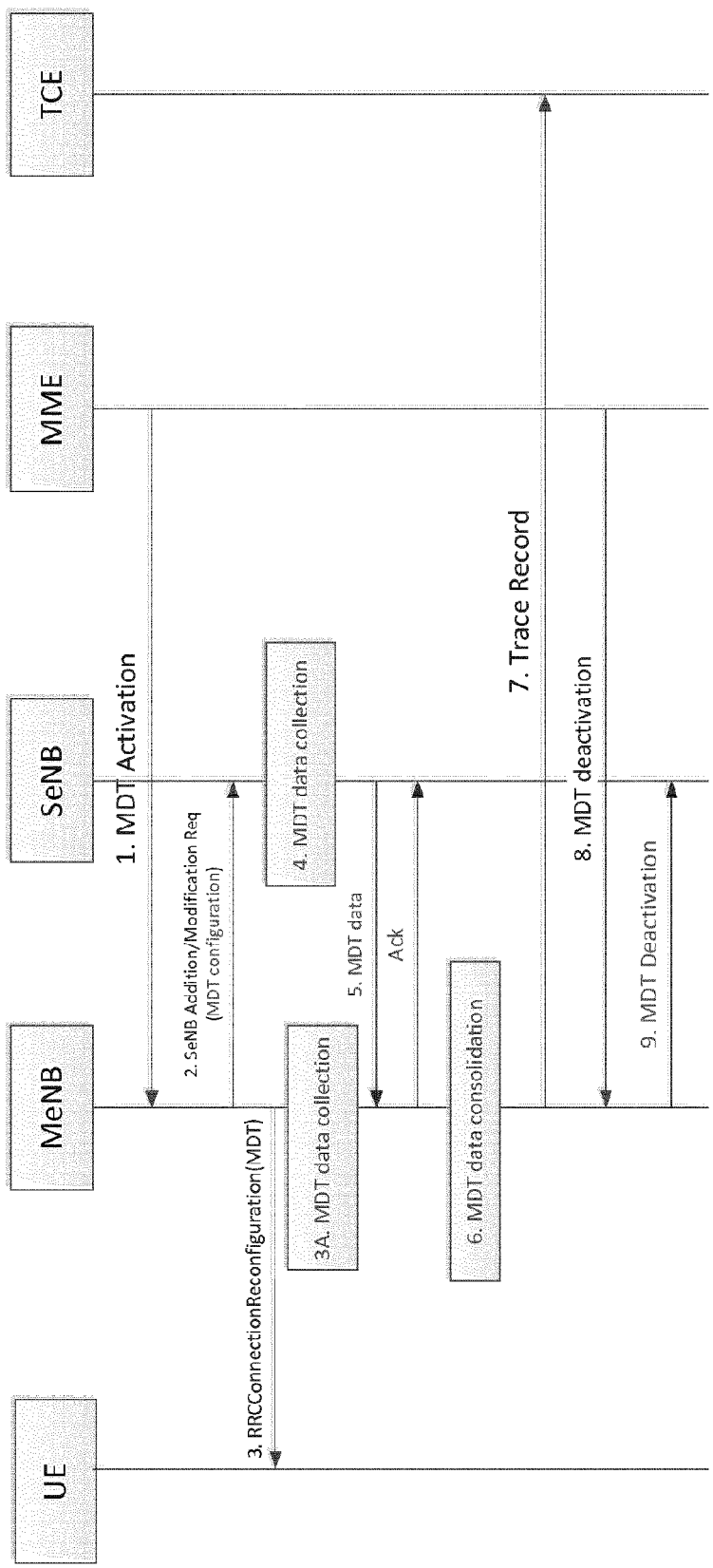
FIG. 5 illustrates a master evolved Node B (MeNB) that consolidates MDT data in accordance with another embodiment.

FIG. 5 illustrates a network node, for example a master evolved Node B (MeNB), that consolidates MDT data in accordance with another embodiment. Referring to FIG. 5, in a second step, the MeNB may send the MDT Configuration, in whole or in part, to a second network node, for example a SeNB. The SeNB may not need to know a TCE or any other trace-related information. In a fifth step, the SeNB may send the MDT data to the MeNB. This may be implemented via a new X2 procedure. In a sixth step, the MeNB may consolidate the MDT data that is received from the SeNB with MDT data collected locally by the MeNB. In a seventh step, the MeNB may send the consolidated Trace Record to the TCE.

Figure 6:
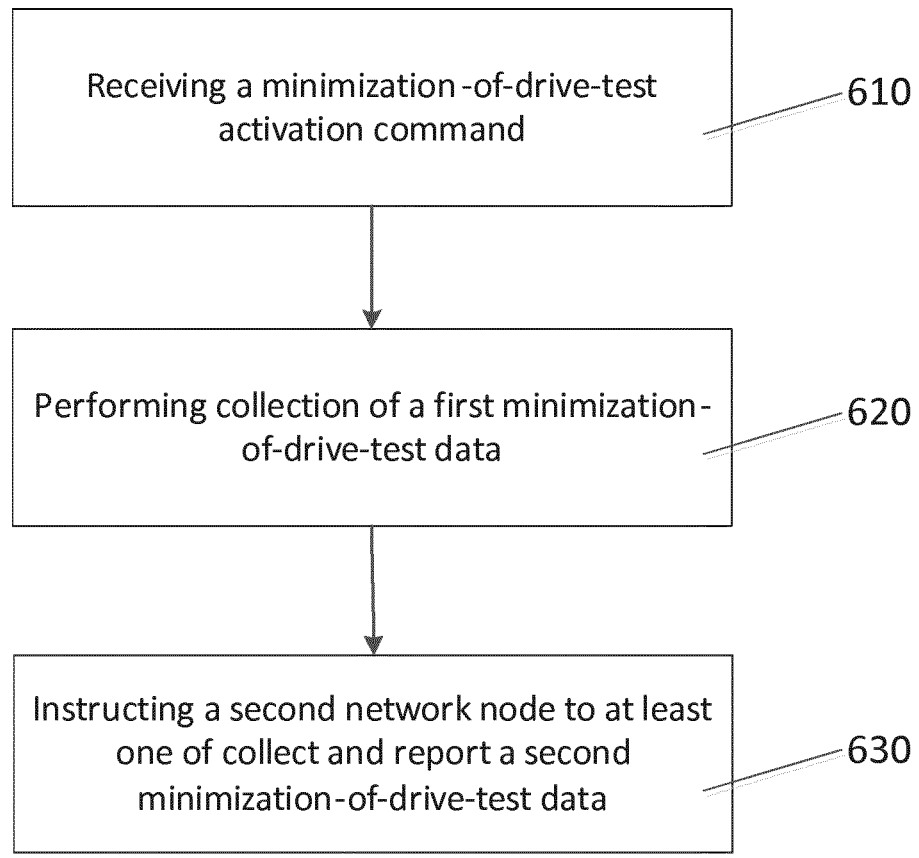
FIG. 6 illustrates a logic flow diagram of a method according to one embodiment.

FIG. 6 illustrates a logic flow diagram of a method according to certain embodiments of the invention. The method illustrated in FIG. 6 may comprise, at 610, receiving, by a first network node, a minimization-of-drive-test activation command. The method may also comprise, at 620, performing, by the first network node, collection of a first minimization-of-drive-test data. The method may also comprise, at 630, instructing, by the first network node, a second network node to at least one of collect and report a second minimization-of-drive-test data.

Figure 7:
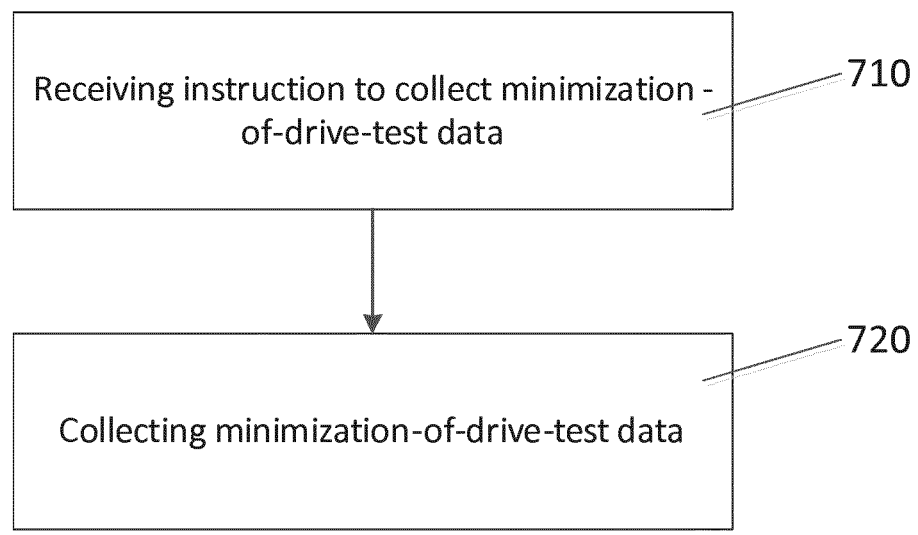
FIG. 7 illustrates a logic flow diagram of another method according to one embodiment.

FIG. 7 illustrates a logic flow diagram of a method according to certain embodiments of the invention. The method illustrated in FIG. 7 may comprise, at 710, receiving, by a first network node, instruction from a second network node to collect minimization-of-drive-test data. The method may also comprise, at 720, collecting minimization-of-drive-test data. A user equipment relating to the minimization-of-drive-test data is connected to the first network node and the second network node in parallel.

Figure 8:
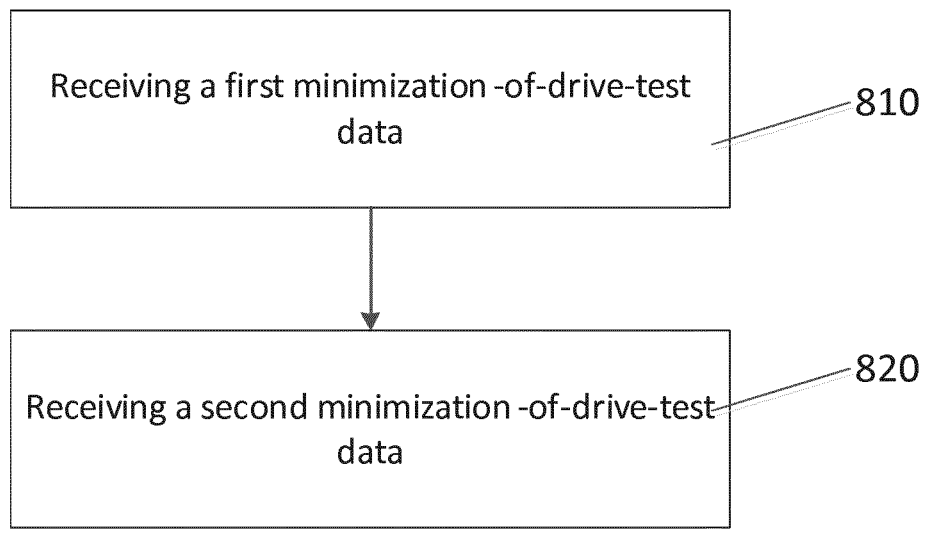
FIG. 8 illustrates a logic flow diagram of another method according to one embodiment.

FIG. 8 illustrates a logic flow diagram of a method according to certain embodiments of the invention. The method illustrated in FIG. 8 may comprise, at 810, receiving, by a first network node, a first minimization-of-drive-test data from a second network node. The method may also comprise, at 820, receiving a second minimization-of-drive test data from a third network node. The second network node and the third network node connect with a user equipment in parallel.

Figure 9:
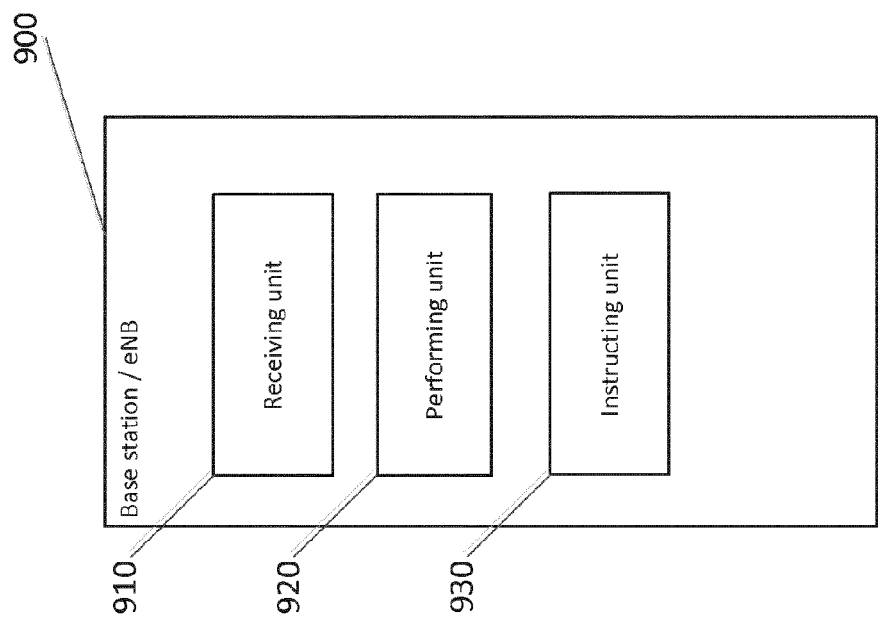
FIG. 9 illustrates an apparatus in accordance with one embodiment.

FIG. 9 illustrates an apparatus in accordance with one embodiment. Apparatus 900 may comprise a receiving unit 910 that receives a minimization-of-drive-test activation command Apparatus 900 may also comprise a performing unit 920 that performs collection of a first minimization-of-drive-test data. Apparatus 900 may also comprise an instructing unit 930 that instructs a network node to at least one of collect and report a second minimization-of-drive-test data.

Figure 10:
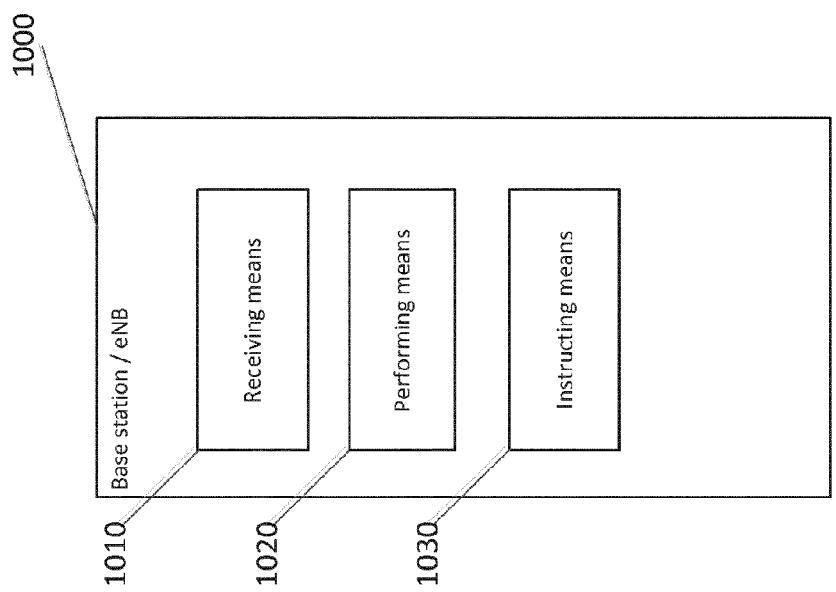
FIG. 10 illustrates an apparatus in accordance with another embodiment.

FIG. 10 illustrates an apparatus in accordance with one embodiment. Apparatus 1000 may comprise a receiving means 1010 that receives a minimization-of-drive-test activation command Apparatus 1000 may also comprise a performing means 1020 that performs collection of a first minimization-of-drive-test data. Apparatus 1000 may also comprise an instructing means 1030 that instructs a network node to at least one of collect and report a second minimization-of-drive-test data.

Figure 11:
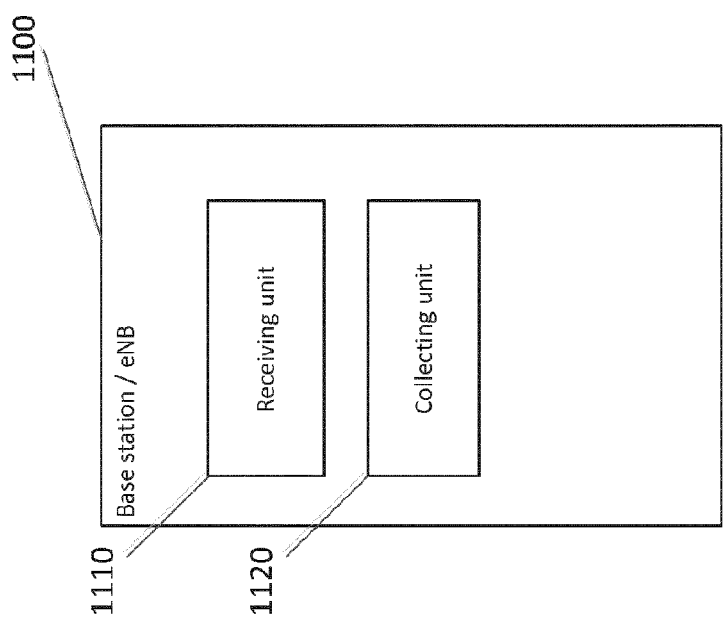
FIG. 11 illustrates an apparatus in accordance with another embodiment.

FIG. 11 illustrates an apparatus in accordance with one embodiment. The apparatus 1100 may comprise a receiving unit 1110 that receives instruction from a network node to collect minimization-of-drive-test data. The apparatus 1100 may also comprise a collecting unit 1120 that collects minimization-of-drive-test data. A user equipment relating to the minimization-of-drive-test data is connected to the apparatus 1100 and the network node in parallel.

Figure 12:
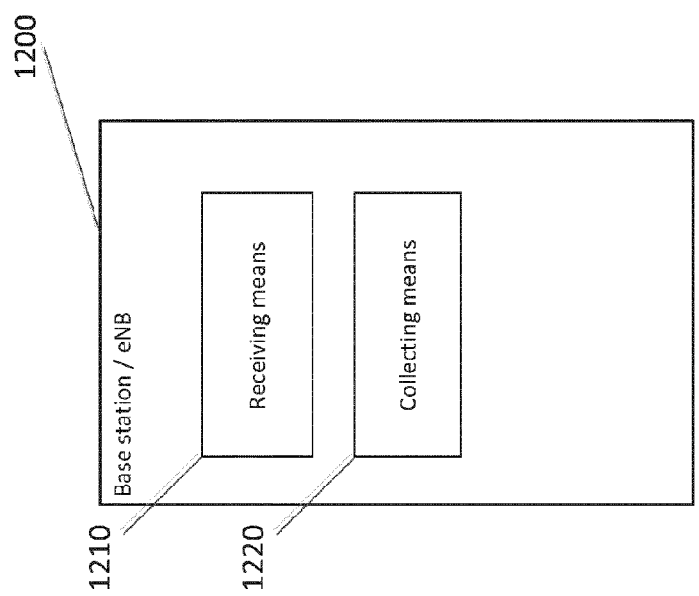
FIG. 12 illustrates an apparatus in accordance with another embodiment.

FIG. 12 illustrates an apparatus in accordance with one embodiment. The apparatus 1200 may comprise a receiving means 1210 that receives instruction from a network node to collect minimization-of-drive-test data. The apparatus 1200 may also comprise a collecting means 1220 for collecting minimization-of-drive-test data. A user equipment relating to the minimization-of-drive-test data is connected to the apparatus 1200 and the network node in parallel.

Figure 13:
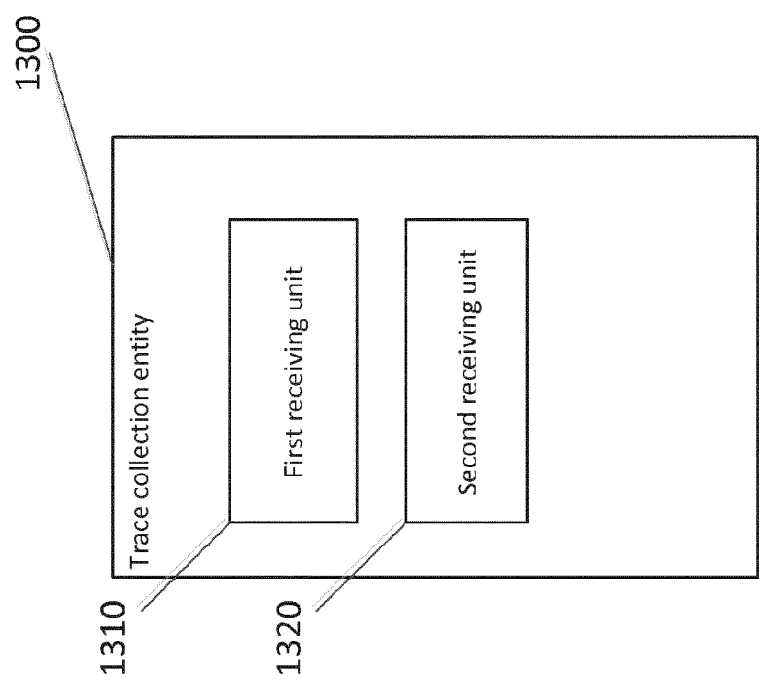
FIG. 13 illustrates an apparatus in accordance with another embodiment.

FIG. 13 illustrates an apparatus in accordance with one embodiment. Apparatus 1300 may comprise a first receiving unit 1310 that receives a first minimization-of-drive-test data from a first network node. Apparatus 1300 may also comprise a second receiving unit 1320 that receives a second minimization-of-drive test data from a second network node. The first network node and the second network node connect with a user equipment in parallel.

Figure 14:
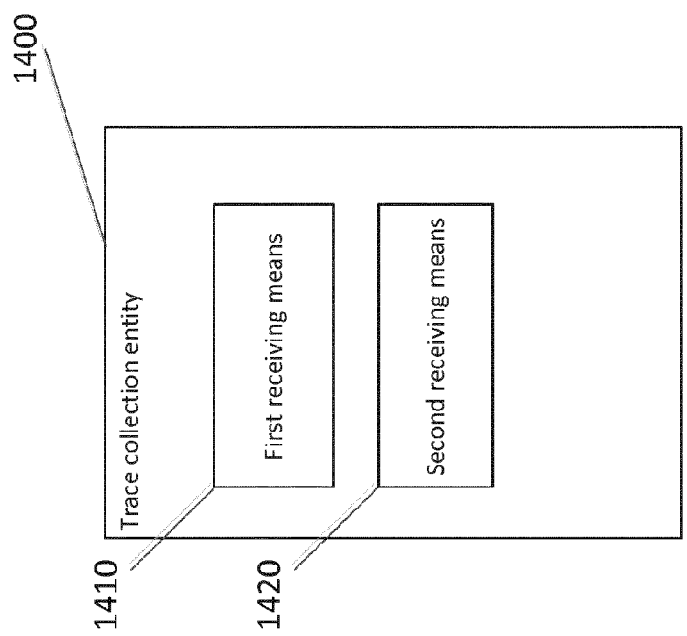
FIG. 14 illustrates an apparatus in accordance with another embodiment.

FIG. 14 illustrates an apparatus in accordance with one embodiment. Apparatus 1400 may comprise a first receiving means 1410 that receives a first minimization-of-drive-test data from a first network node. Apparatus 1400 may also comprise a second receiving means 1420 that receives a second minimization-of-drive test data from a second network node. The first network node and the second network node connect with a user equipment in parallel.

Figure 15:
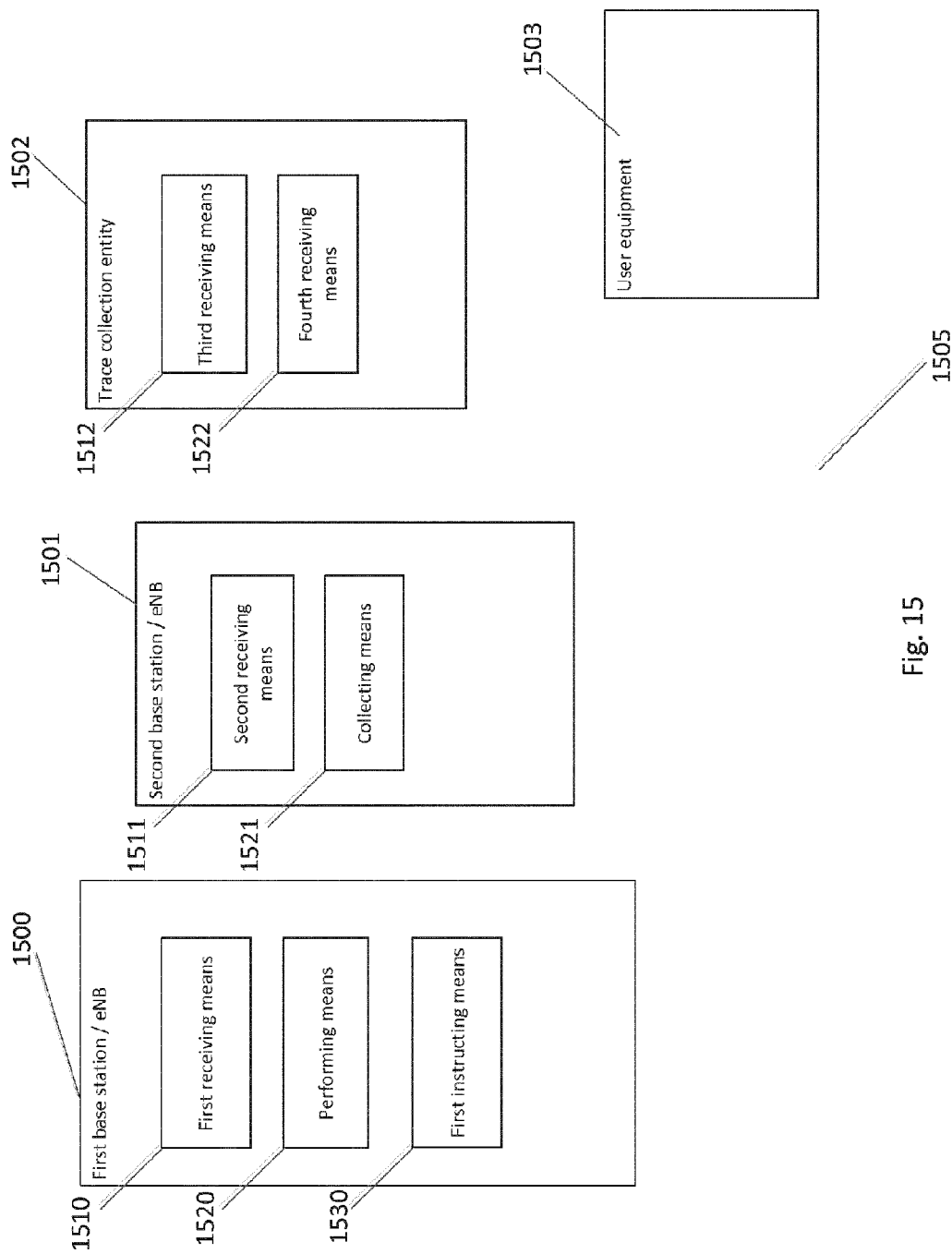
FIG. 15 illustrates a system in accordance with one embodiment.

FIG. 15 illustrates a system in accordance with one embodiment. System 1505 may comprise a first apparatus 1500. First apparatus 1500 may comprise a first receiving means 1510 for receiving a minimization-of-drive-test activation command First apparatus 1500 may also comprise a performing means 1520 for performing collection of a first minimization-of-drive-test data. First apparatus 1500 may also comprise a first instructing means 1530 for instructing a second apparatus 1501 to at least one of collect and report a second minimization-of-drive-test data. System 1505 may also comprise a second apparatus 1501. Second apparatus 1501 may comprise a second receiving means 1511 for receiving instruction from the first apparatus 1500 to collect the second minimization-of-drive-test data. Second apparatus 1501 may also comprise collecting means 1521 for collecting the second minimization-of-drive-test data. System 1505 may also comprise a third apparatus 1502. Third apparatus 1502 may comprise a third receiving means 1512 for receiving the first minimization-of-drive-test data from the first apparatus 1500. Third apparatus 1502 may also comprise a fourth receiving means 1522 for receiving the second minimization-of-drive test data from the second apparatus 1501. A user equipment 1503 relating to the first and the second minimization-of-drive-test data is connected to the second apparatus 1501 and the first apparatus 1500 in parallel.

Figure 16:
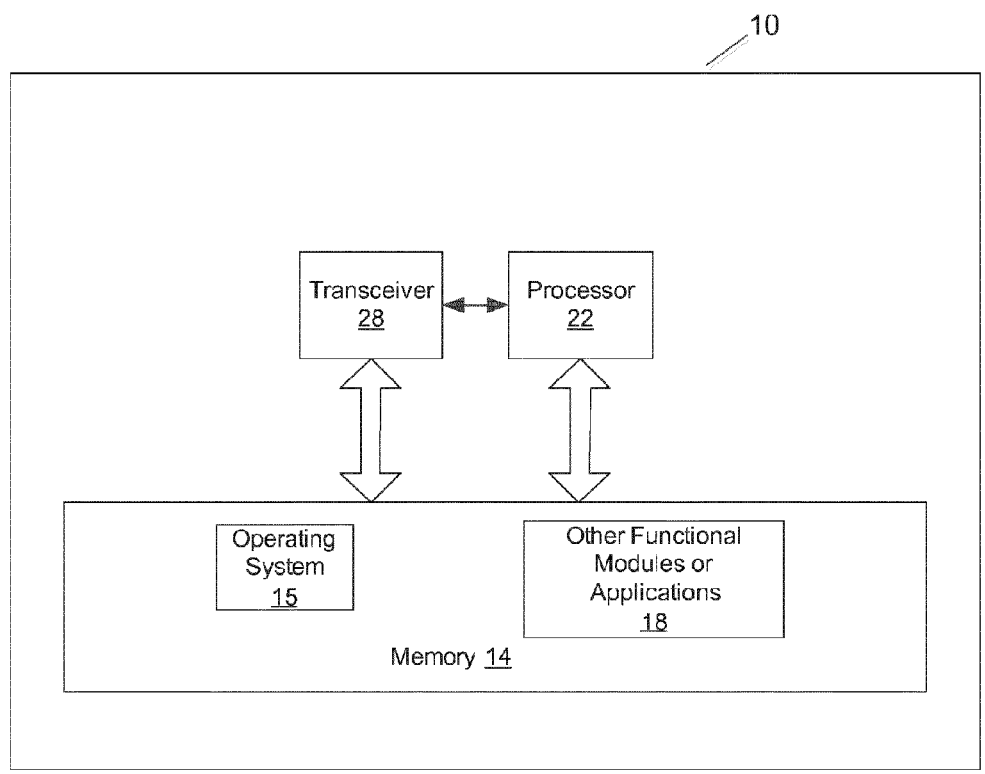
FIG. 16 illustrates an apparatus in accordance with another embodiment.

FIG. 16 illustrates an apparatus 10 according to embodiments of the invention. Apparatus 10 can be a device, such as a UE, for example. In other embodiments, apparatus 10 can be a base station and/or access point, for example. Apparatus 10 can also comprise a network node that performs the function of a trace collection entity, for example.

Apparatus 10 can comprise a processor 22 for processing information and executing instructions or operations. Processor 22 can be any type of general or specific purpose processor. While a single processor 22 is shown in FIG. 16, multiple processors can be utilized according to other embodiments. Processor 22 can also comprise one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further comprise a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can comprise program instructions or computer program code that, when executed by processor 22, enable the apparatus 10 to perform tasks as described herein.

Apparatus 10 can also comprise one or more antennas (not shown) for transmitting and receiving signals and/or data to and from apparatus 10. Apparatus 10 can further comprise a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 comprising, without limitation, precoding of antenna gain/phase parameters, encoding and decoding of individual bits forming a communication message, formatting of information, and overall control of the apparatus 10, comprising processes related to management of communication resources.

In certain embodiments, memory 14 stores software modules that provide functionality when executed by processor 22. The modules can comprise an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
   at least one processor; and
   at least one memory including computer program code,
   wherein the at least one memory and the computer program code are configured to, with the at least one processor, cause the apparatus at least to:
   receive a minimization-of-drive-test activation command;
   perform collection of a first minimization-of-drive-test data;
   instruct a first network node to at least one of collect and report a second minimization-of-drive-test data;
   receive the second minimization-of-drive-test data collected by the first network node;
   consolidate the first minimization-of-drive-test data collected by the apparatus with the second minimization-of-drive-test data collected by the first network node; and
   transmit the consolidated minimization-of-drive-test data to a second network node.

2. The apparatus according to claim 1, wherein the second network node comprises a trace collection entity.

3. The apparatus according to claim 1, wherein the instructing the first network node to collect the second minimization-of-drive-test data comprises transmitting a minimization-of-drive-test configuration information in an Addition Request message, a Modification Request message, or an X2 message.

4. The apparatus according to claim 1, wherein the at least one memory and the computer program code are configured to, with the at least one processor, cause the apparatus at least to instruct the first network node to stop collecting the second minimization-of-drive-test data.

5. The apparatus according to claim 4, wherein the instructing the first network node to stop collecting the second minimization-of-drive-test data comprises transmitting a Release Request message or a X2 message.

6. The apparatus according to claim 1, wherein the first minimization-of-drive-test data comprises a radio access bearer identifier associated with the measurement.

7. The apparatus according to claim 1, wherein at least one of the apparatus and the first network node comprises a base station.

8. The apparatus according to claim 1, wherein the first and the second minimization-of-drive-test data is related to a user equipment, and wherein the apparatus is connected to the user equipment in parallel to a connection between the first network node and the user equipment.

9. An apparatus, comprising:
   at least one processor; and
   at least one memory including computer program code,
   wherein the at least one memory and the computer program code are configured to, with the at least one processor, cause the apparatus at least to:
   receive a minimization-of-drive-test activation command;
   perform collection of a first minimization-of-drive-test data;
   instruct a first network node to at least one of collect and report a second minimization-of-drive-test data; and
   transmit the first minimization-of-drive-test data collected by the apparatus to a second network node, wherein the transmitting the first minimization-of-drive-test data collected by the apparatus to the second network node comprises transmitting to a node that consolidates the first minimization-of-drive-test data collected by the apparatus with other minimization-of-drive-test data.

10. An apparatus, comprising:
    at least one processor; and
    at least one memory including computer program code,
    wherein the at least one memory and the computer program code are configured to, with the at least one processor, cause the apparatus at least to:
    receive a first minimization-of-drive-test data from a first network node connected with a user equipment; and
    receive a second minimization-of-drive test data from a second network node connected with the user equipment, wherein the first network node and the second network node connected with the user equipment in parallel.

11. The apparatus according to claim 10, wherein the at least one memory and the computer program code are configured to, with the at least one processor, cause the apparatus at least to consolidate the received first minimization-of-drive test data and the received second minimization-of-drive test data, wherein the consolidation comprises aggregating at least one of uplink data volume, downlink data volume, uplink data throughput, and downlink data throughput.

12. The apparatus according to claim 10, wherein the apparatus comprises a trace collection entity, and at least one of the first network node and the second network node comprises a base station.

* * * * *